Patented June 13, 1933

1,913,478

UNITED STATES PATENT OFFICE

EDUARD DÖRR AND OTTO LEUCHS, OF ELBERFELD, AND LEO ROSENTHAL, OF VOHWINKEL, NEAR ELBERFELD, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF WORKING UP ETHYL CELLULOSE INTO HOMOGENEOUS PLASTIC MASSES

No Drawing. Application filed May 20, 1929, Serial No. 364,690, and in Germany March 31, 1927.

The present invention relates to a process of working up ethyl cellulose into homogeneous plastic masses, more particularly it relates to a process of preparing homogeneous plastic masses from ethyl cellulose with an ethoxy content of 42–48%.

According to the present invention, ethyl cellulose with an ethoxy content of about 42–48% is worked up into homogeneous plastic masses by means of an organic solvent which dissolves the cellulose ether when hot, but which does not dissolve said cellulose ether in the cold. In carrying out our process the ethyl cellulose is dissolved in the hot solvent as mentioned above, if desired, the solution may be filtered, for example through a filter cloth, and then the solution is cooled, whereby the ethyl cellulose separates. This separation generally is finished when the solution has reached a temperature of about 20° C. The ethyl cellulose which has been separated is filtered and, while it still contains some of the solvent, is worked up into a homogeneous plastic mass by removing the solvent in the usual manner, for example, mechanically or with the application of heat as for instance by treating the mass on heated rollers, if desired in vacuo. The process is advantageously carried out by preparing highly concentrated solutions of the ethyl cellulose, say by dissolving about 1 part of the ethyl cellulose in 1 to 4 parts of the solvent at a temperature of about 80° C. or more and if necessary, mechanically promoting the process of dissolving of the ethyl cellulose, for example by kneading. On cooling, the ethyl cellulose separates and solidifies to form a more or less jelly-like mass from which the solvent is removed in the usual manner, say by rolling and heating.

If desired, there may be added to the solution of the ethyl cellulose organic or inorganic coloring matters, or inert fillers such as talcum or saw-dust or plastifying agents such as camphor, tricresylphosphate and the like.

Suitable solvents for the purpose of our invention are benzene, aliphatic and hydroaromatic hydrocarbons, having a boiling point of about at least 80° C., such as ligroin, hydrotoluene, cyclohexane or mixtures of these hydrocarbons, for example mixtures of hydroaromatic hydrocarbons known by the trade-names "Bornylan" and "Sangajol", said mixtures being obtained from Borneo earth oil and having a boiling point from 130–154° C. and 160–170° C. respectively.

The specific solvent to be used for the purpose of the invention depends on the ethoxy content of the cellulose. Thus for the lower ethylated celluloses in the above identified range, say for celluloses with an ethoxy content of 42–45%, benzene is a suitable solvent, while for the higher ethylated celluloses, say with an ethoxy content of 46–48%, the above mentioned aliphatic and hydroaromatic hydrocarbons may be applied as proper solvents.

There may be used of course mixtures of benzene and aliphatic or hydroaromatic hydrocarbons, but care must be taken that the specific mixture used is adapted to the ethyl cellulose to be purified, that is, the higher the ethoxy content is the higher must be the ratio of the aliphatic or hydroaromatic hydrocarbon in the mixture.

The invention is illustrated by the following examples, but is not restricted thereto:

Example 1

2 kgs. of ethyl cellulose containing 46% of ethoxy groups are dissolved in 40 kgs. of ligroin, (boiling point 110° C.) or in Bornylan at 80–90° C.; the solution is filtered hot, if necessary, through a filter press and then cooled to room temperature in a stirring vessel with thorough stirring. The ethyl cellulose precipitates as a fine flaky product. It is isolated and treated on heated rollers of 60° C. until the greater part of the solvent has been removed. On cooling the mass yields a hard, tough and elastic material.

Example 2

25 parts by weight of ethyl cellulose with an ethoxy content of 47% and 75 parts by weight of bornylan, having a boiling point of about 110° C. are worked up to a homogeneous paste in a kneading apparatus at 80–90° C. The material, which is plastic at this temperature, is treated on rollers heated to about 90° C. until the greater part of the bornylan has been removed. On cooling the mass yields a hard, tough and elastic material.

The material, thus obtained, may be further worked up into articles of manufacture in the known manner.

Example 3

2 kgs. of ethyl cellulose having an ethoxy content of 44% are dissolved at 80–90° C. in 4 kgs. of a mixture consisting of 1 part benzene and 1 part of bornylan and the solution is cooled to 30° C. A transparent gelatin-like mass precipitates. The mass is rolled with rollers into plates at about 60° C. and rolling is continued until the greater part of the solvent has been removed. On cooling a hard, tough and elastic material is obtained.

This is a continuation in part of our application Ser. No. 260,240, filed March 8, 1928.

We claim:—

1. A process of preparing homogeneous plastic masses from ethyl cellulose which process comprises dissolving ethyl cellulose with an ethoxy content of 42 to 48% at about 80° C. in an organic solvent which dissolves the ethyl cellulose only when hot of the group consisting of benzene-aliphatic- and hydro-aromatic-hydrocarbons having a boiling point of at least about 80° C., precipitating the ethyl cellulose by cooling the solution at least to 30° C., filtering and working up the precipitate formed, while still containing some of the solvent, into plastic masses.

2. A process of preparing homogeneous plastic masses from ethyl cellulose which process comprises dissolving ethyl cellulose with an ethoxy content of 42 to 48% at about 80° C. in an organic solvent which dissolves the ethyl cellulose only when hot of the group consisting of benzene-aliphatic- and hydro-aromatic-hydrocarbons having a boiling point of at least 80° C., precipitating the ethyl cellulose by cooling the solution at least to 30° C., filtering and mechanically removing the solvent from the precipitate formed.

3. A process of preparing homogeneous plastic masses from ethyl cellulose which process comprises dissolving ethyl cellulose with an ethoxy content of 42 to 48% at about 80° C. in an organic solvent which dissolves the ethyl cellulose only when hot of the group consisting of benzene-aliphatic- and hydro-aromatic-hydrocarbons having a boiling point of at least 80° C., precipitating the ethyl cellulose by cooling the solution at least to 30° C., filtering and mechanically removing the solvent from the precipitate formed with the application of heat.

4. A process of preparing homogeneous plastic masses from ethyl cellulose which process comprises dissolving ethyl cellulose with an ethoxy content of 42 to 48% at about 80° in ligroin, precipitating the ethyl cellulose by cooling the solution at least to 30° C., filtering and working up the precipitate formed, while still containing some of the solvent, into plastic masses.

5. A process of preparing homogeneous plastic masses from ethyl cellulose which process comprises dissolving one part by weight of ethyl cellulose with an ethoxy content of 46% in 20 parts by weight of ligroin, having a boiling point of 110° C., at about 80° C., precipitating the ethyl cellulose, while stirring, by cooling the solution to about 20° C., filtering and removing the solvent from the fine flakes formed by treating the product on rollers at 60° C.

6. A process of preparing homogeneous plastic masses from ethyl cellulose which process comprises dissolving ethyl cellulose with an ethoxy content of 42 to 48% at about 80° C. in a mixture of hydrocarbons boiling from 130 to 154° C. and being obtained by fractionating Borneo earth oil, precipitating the ethyl cellulose by cooling the solution at least to 30° C., filtering and working up the precipitate formed, while still containing some of the solvent, into plastic masses.

7. A process of preparing homogeneous plastic masses from ethyl cellulose which process comprises dissolving one part by weight of ethyl cellulose with an ethoxy content of 46% in 20 parts by weight of a mixture of hydrocarbons boiling from 130 to 154° C. and being obtained by fractionating Borneo earth oil at about 80° C., precipitating the ethyl cellulose, while stirring, by cooling the solution to about 20° C., filtering and removing the solvent from the fine flakes formed by treating the product on rollers at 60° C.

8. A process of preparing homogeneous plastic masses from ethyl cellulose which process comprises dissolving ethyl cellulose with an ethoxy content of 42 to 48% at about 80° C. in a mixture consisting of one part of benzene and one part of a mixture of hydrocarbons boiling from 130 to 154° C. and being obtained by fractionating Borneo earth oil, precipitating the ethyl cellulose by cooling the solution at least to 30° C., filtering and working up the precipitate formed, while still containing some of the solvent, into plastic masses.

9. A process of preparing homogeneous plastic masses from ethyl cellulose which process comprises dissolving one part by weight of ethyl cellulose with an ethoxy content of 44% in 20 parts by weight of a mixture of benzene and a mixture of hydrocarbons boiling from 130 to 154° C. and being obtained by fractionating Borneo earth oil, at about 80° C., precipitating the ethyl cellulose, while stirring, by cooling the solution to 30° C., and filtering and removing the solvent from the gelatinous mass formed by treating the same on rollers at about 60° C.

In testimony whereof, we hereunto set our hands and affix our seals.

EDUARD DÖRR [L. S.]
OTTO LEUCHS. [L. S.]
LEO ROSENTHAL. [L. S.]